April 13, 1954 — C. F. HAUTAU — 2,675,272
ATTACHING MEANS FOR AUTOMOBILE WHEEL HUBCAPS OR SHIELDS
Filed Feb. 19, 1952 — 2 Sheets-Sheet 1

INVENTOR.
CHARLES F. HAUTAU
BY Edward M. Apple
ATTORNEY

April 13, 1954     C. F. HAUTAU     2,675,272
ATTACHING MEANS FOR AUTOMOBILE WHEEL HUBCAPS OR SHIELDS
Filed Feb. 19, 1952     2 Sheets-Sheet 2

INVENTOR.
CHARLES F. HAUTAU
BY Edward M. Apple
ATTORNEY

Patented Apr. 13, 1954

2,675,272

UNITED STATES PATENT OFFICE 2,675,272

ATTACHING MEANS FOR AUTOMOBILE WHEEL HUB CAPS OR SHIELDS

Charles F. Hautau, Huntington, Mich.

Application February 19, 1952, Serial No. 272,320

9 Claims. (Cl. 301—37)

1

This invention relates to automobile vehicle wheels and has particular reference to a hub cap or shield or other decorative element for such a wheel and means for securing the same to the wheel.

An object of the invention is to generally improve such devices and to provide a device of that character which is simple in construction, economical to manufacture and efficient in operation.

Another object of the invention is to provide a hub cap or wheel shield which may be readily attached to and detached from the wheel.

Another object of the invention is to provide attaching means for a hub cap or wheel shield which are comparatively light in weight with the result that any tendency to unbalance the wheel to which they are attached is minimized and all tendency toward vibration and rattle is obviated.

Another object of the invention is to provide a hub cap or wheel shield which, when in use, employs a clawing action on the wheel whereby increased holding power is developed without danger of damaging the wheel finish.

Another object of the invention is to provide a hub cap or wheel shield attaching means which facilitate the storage and shipment of the caps or shields for the reason that due to their simplicity, the attaching means can be secured to the hub caps or wheel shields by simple tools at sub-assembling depots.

The foregoing and other objects and advantages of the invention will become more apparent as the description proceeds, reference being made from time to time to the accompanying drawings forming part of the within disclosure, in which drawings.

2

Figure 7:
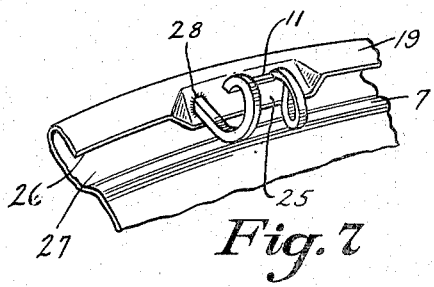

Fig. 7 is an enlarged fragmentary detail showing a modified form of the invention.

Figure 1:
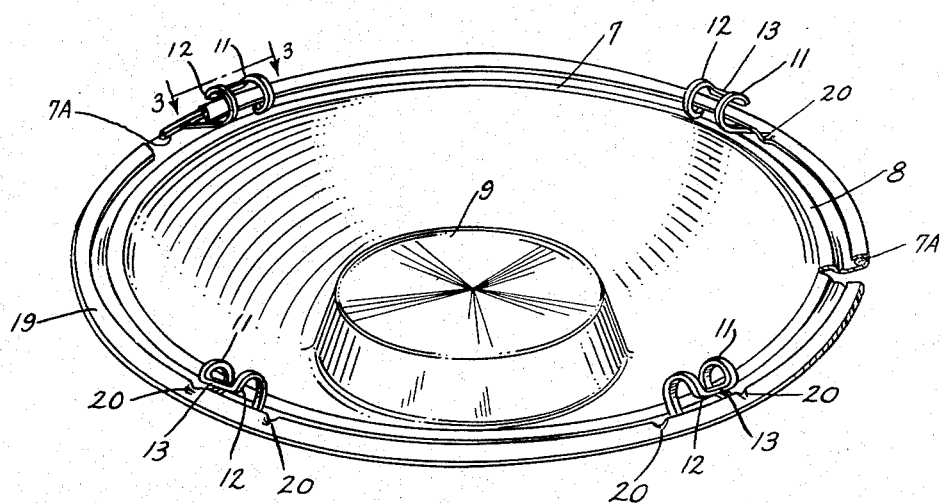
Fig. 1 is a perspective view of the inside of a hub cap or wheel shield, with parts broken away, embodying my invention.
Figure 2:
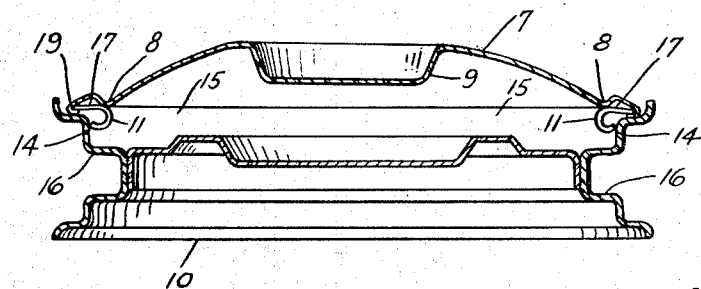
Fig. 2 is a section taken through a conventional disc wheel for an automobile to which is attached the hub cap or wheel shield as shown in Fig. 1.

Referring now more particularly to the drawing, it will be understood that in the embodiment herein disclosed the reference character 7 indicates in general the hub cap or wheel shield, which is substantially dish shaped, as shown in Figs. 1 and 2, and which is provided with an annular bead 8 and a centrally positioned raised portion 9 (Fig. 1) which normally covers the hub of the wheel 10 (Fig. 2). It will be understood that in Fig. 2, the shield 1 is turned 180° from the position shown in Fig. 1. It will be noted that there is no physical contact between the central portion 9 of the shield 7 and the wheel 10. There being only peripherial contact between the shield 7 and the wheel 10. This is an important feature of the invention.

In the earlier development of the conventional automobile wheel, only the central part or hub of the wheel was covered with a so called hub cap, which was always in physical contact with the wheel. Recent tendencies, however, have been to increase the diameter of the so called hub caps, until now they cover substantially the entire wheel, so that the proper terminology of such a device would correctly be a wheel shield, instead of a hub cap. In any event, the device 7 functions to cover the wheel hub and add a decorative appearance to the entire wheel. The modern tendency has also been to make the decorative shield 7 of a lighter gage metal, which, if not properly attached to the wheel 10, would rattle and vibrate. It is therefore, one of the objects of this invention to obviate such conditions. I have accomplished this result by novel attaching means which I will now describe. These attaching means not only obviate any tendency of the shield 7 to rattle and vibrate, but also permit the shield 7 to be easily and quickly removed from the wheel 10, and as easily be attached.

Figure 3:
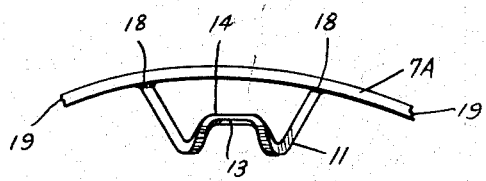
Fig. 3 is a view, with part of the rolled edge broken away, taken substantially on the line 3—3 of Fig. 1.

The attaching means are generally indicated with the reference character 11, and preferably consist of a rod or wire stock having a substantially square cross section. Each length of rod stock comprising one of the attaching elements 11 (Fig. 3) is bent and re-bent to form a hook like element 12, having a substantially wide central portion 13, which, because of the square cross section of the rod, presents a comparatively sharp edge 14 (Fig. 2) to the inside face 15 of the rim portion 16 of the wheel 10. The long sharp edge 14 provides an extensive bearing surface between each fastening element 11 and the wheel rim 16. When the wheel shield 7 is mounted to the wheel 10, the attaching means 11 deflects until the shank 17 is firmly against the bead 8. Thereafter, any force which tends to dislodge the wheel shield 7 causes the sharp edge 14 of the attaching means 11 to dig into the rim section 16 of the wheel 10. This action results from the springing effect between the sharp edge 14 and the shank 17.

The attaching elements 11 (Figs. 1 and 3) are secured to the ring 7A by welding the ends thereto as at 18, after which the annular ring 7A is compressed circumferentially and inserted underneath the rolled edge 19 of the wheel shield 7. I crimp the rolled edge of the shield 7, as at 20 (Fig. 1), to keep the attaching elements 11 and the ring 7A from shifting. The ring 7A can be continuous or of split form. It will be noted that the fastening elements 11 have resiliency in order to shift from that position, as shown in Fig. 1, to that position shown in Fig. 2, when the shield 7 is placed on to the wheel 10.

Figure 6:
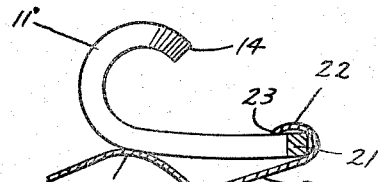
Fig. 6 is a section taken substantially on the line 6—6 of Fig. 4.
Figure 4:
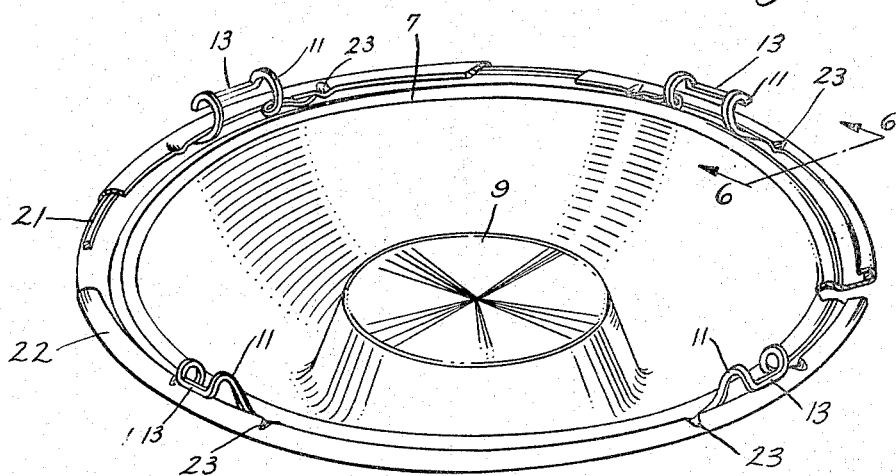
Fig. 4 is a modified form of a device embodying the invention.
Figure 5:
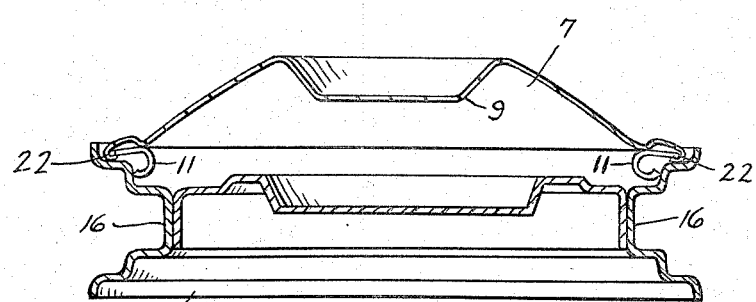
Fig. 5 is a section taken through a conventional wheel having attached thereto, the modified form of the hub cap or wheel shield shown in Fig. 4.

In Figs. 4, 5, and 6, I show a modified way of securing the attaching means 11 to the shield 7. In the modified form the attaching elements 11, instead of being individually formed of separate lengths of square rod stock, are formed integrally on a continuous ring 21, which is preferably held in position beneath the rolled edge 22 as shown in Figs. 4, 5, and 6. In this embodiment, the rolled edge 22 is also crimped, as at 23, to obviate any tendency of the ring 21 to become displaced. In all other respects, the attaching elements 11 function as previously described.

In Fig. 7, I show another modified way of securing the attaching elements 11 to the shield 7. In this modified form, the rolled edge 19 is flattened as at 25, to provide an abutment between the free edge 26 and the portion 27 of the shield 7. The ends of the shank portions of the attaching elements 11 are then welded to the flattened portion 25 of the shield 7 to secure them in position.

Having described my invention, what I claim and desire to secure by Letters Patent is:

1. The combination with a wheel and a shield therefore, of means for attaching the shield to the wheel, said means comprising a plurality of wide hooks, each hook comprising two curved legs and two straight shanks and an integral straight web secured to a ring positioned along the outer edge of said shield, the web portion of each hook being arranged to engage an element of the rim portion of said wheel, which is parallel to the axis of the wheel.

2. The structure of claim 1, in which said hooks are formed of stock having a substantially square cross section and each is arranged on the shield, whereby to present an extensive sharp bearing edge to the rim of the said wheel.

3. The structure of claim 1, in which each of said hooks is formed of stock having a substantially square cross section and is arranged on the shield, so that it presents an extensive length of one of the sharp edges of said square stock to the rim area of said wheel, whereby to effect a clawing action between said shield and said wheel.

4. The structure of claim 1, in which the shank portions of said hooks engage an annular bead formed on said shield, whereby to effect a resilient frictional engagement between said shield and said wheel.

5. The combination with a wheel and a shield therefor, of means for attaching the shield to the wheel, comprising a plurality of flexible wire elements of square cross section, secured in spaced relation along the outer periphery of said shield, each said element having a pair of spaced shanks, and an intermediate web the edge of which serves as a sharp bearing portion which engages the rim portion of said wheel.

6. The structure of claim 5, in which the said intermediate bearing portion of each element is arranged to present to the rim portion of the wheel a long expanse of one of the sharp edges of said square stock.

7. The structure of claim 5, in which the said intermediate bearing portion of each element is arranged to present to the rim portion of the wheel a long expanse of one of the sharp edges of said square stock, and the shanks of each element are arranged to contact an annular bead, formed on said shield, whereby to effect a resilient locking action between said shield and said wheel.

8. The structure of claim 5, in which the said intermediate bearing portion of each element is arranged to present to the rim portion of the wheel a long expanse of one of the sharp edges of said square stock, and the shanks of each element are arranged to contact an annular bead formed on said shield, whereby to effect a resilient locking action between said shield and said wheel, and whereby the central portion of said shield is held in spaced relation with the hub portion of said wheel.

9. The structure of claim 5, in which the rim of said shield is formed with spaced flattened areas and said fastening elements are secured by welding to said flattened areas.

References Cited in the file of this patent

UNITED STATES PATENTS

| Number | Name | Date |
|---|---|---|
| 771,740 | McKeel | Oct. 4, 1904 |
| 1,836,424 | Yanss | Dec. 15, 1931 |
| 2,055,047 | Place | Sept. 22, 1936 |

FOREIGN PATENTS

| Number | Country | Date |
|---|---|---|
| 314,229 | Italy | Jan. 20, 1934 |
| 812,968 | France | May 21, 1937 |